(12) United States Patent
Miyoshi et al.

(10) Patent No.: US 10,795,253 B2
(45) Date of Patent: Oct. 6, 2020

(54) PROJECTION APPARATUS WITH WAVELENGTH BAND BASED ON IDENTIFIED REGION, PROJECTION SYSTEM, METHOD FOR CONTROLLING PROJECTION APPARATUS

(71) Applicant: SEIKO EPSON CORPORATION, Tokyo (JP)

(72) Inventors: Kazuhiro Miyoshi, Matsumoto (JP); Kiichi Hirano, Kyoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/253,747

(22) Filed: Jan. 22, 2019

(65) Prior Publication Data
US 2019/0227423 A1 Jul. 25, 2019

(30) Foreign Application Priority Data

Jan. 23, 2018 (JP) .................. 2018-008600

(51) Int. Cl.
*G03B 21/56* (2006.01)
*G03B 21/60* (2014.01)
*G03B 21/20* (2006.01)

(52) U.S. Cl.
CPC ....... *G03B 21/567* (2013.01); *G03B 21/2013* (2013.01); *G03B 21/2033* (2013.01); *G03B 21/60* (2013.01)

(58) Field of Classification Search
CPC .............. G03B 21/567; G03B 21/2013; G03B 21/2033; G03B 21/60; A01G 17/00; A01G 17/005
See application file for complete search history.

(56) References Cited

U.S. PATENT DOCUMENTS

| | | | | |
|---|---|---|---|---|
| 2007/0289207 A1* | 12/2007 | May | ................... | A01G 7/00 47/17 |
| 2010/0076620 A1* | 3/2010 | Loebl | ................... | A01G 9/26 700/306 |
| 2010/0115830 A1* | 5/2010 | Dube | ................... | A01G 7/045 47/17 |

(Continued)

FOREIGN PATENT DOCUMENTS

| | | | |
|---|---|---|---|
| CN | 203949046 U | * 11/2014 | ............... A01G 9/20 |
| JP | H10-14401 A | 1/1998 | |

(Continued)

*Primary Examiner* — Michelle M Iacoletti
*Assistant Examiner* — Magda Cruz
(74) *Attorney, Agent, or Firm* — Oliff PLC

(57) ABSTRACT

A projection apparatus including a light source section, a projection section that projects light outputted from the light source section, and a control section that acquires captured image data produced by an imaging section, identifies a region of a projection target contained in the acquired captured image data and an image captured position of the region in the captured image data, determines a projection range over which the projection section projects light and a wavelength band of the light to be projected over the projection range based on the identified region and image captured position, and controls the projection section to cause the projection section to project light in the determined wavelength band over the determined projection range.

18 Claims, 9 Drawing Sheets

(56) References Cited

U.S. PATENT DOCUMENTS

| | | | |
|---|---|---|---|
| 2010/0287830 A1* | 11/2010 | Chen | A01G 7/045 47/58.1 LS |
| 2011/0252705 A1* | 10/2011 | Van Gemert | A01G 9/02 47/66.7 |
| 2012/0218750 A1* | 8/2012 | Klase | F21V 5/007 362/231 |
| 2013/0000185 A1* | 1/2013 | Tanase | A01G 7/045 47/17 |
| 2014/0215915 A1 | 8/2014 | Suzuki | |
| 2014/0215918 A1 | 8/2014 | Takeuchi et al. | |
| 2015/0009030 A1* | 1/2015 | Shih | A01G 7/00 340/540 |
| 2015/0313092 A1* | 11/2015 | Pocock | H05B 45/00 47/58.1 LS |
| 2017/0311414 A1* | 10/2017 | Kido | H05B 47/105 |
| 2017/0339839 A1* | 11/2017 | Carstensen | A01G 22/00 |

FOREIGN PATENT DOCUMENTS

| | | |
|---|---|---|
| JP | 2001-095376 A | 4/2001 |
| JP | 2004-121033 A | 4/2004 |
| JP | 2014-147372 A | 8/2014 |
| JP | 2014-147375 A | 8/2014 |

* cited by examiner

PROJECTION APPARATUS WITH WAVELENGTH BAND BASED ON IDENTIFIED REGION, PROJECTION SYSTEM, METHOD FOR CONTROLLING PROJECTION APPARATUS

BACKGROUND

1. Technical Field

The present invention relates to a projection apparatus, a projection system, and a method for controlling the projection apparatus.

2. Related Art

There is a known method for facilitating the growth of a plant by irradiating the plant with artificial light (see JP-A-2014-147375, for example).

JP-A-2014-147375 discloses a plant cultivation method including the step of irradiating a plant with red light, the step of irradiating the plant with blue light, and the step of irradiating the plant with infrared light, with the steps carried out separately and independently in a fixed period.

For example, it is known that the effect provided by the light with which a plant is irradiated varies depending on the wavelength of the light. A higher effect can be provided in some cases by optimization of the wavelength of the projected light and a region which is part of the plant and on which the light is projected in consideration of the growth process of the plant and the region of the plant, such as leaves, stems, and flowers. Conceivable examples in which a higher effect is provided by optimization of the wavelength of the projected light and a region on which the light is projected include nail coating performed on a nail of a person's finger with the aid of UV curing and curing of a UV curable adhesive.

SUMMARY

An advantage of some aspects of the invention is to control function corresponding to a region of a projection target by using light projected by a projection apparatus.

An aspect of the invention is directed to a projection apparatus including a light source section, a projection section that projects light outputted from the light source section, an acquirer that acquires a captured image containing a captured projection target, an identifier that identifies a region of the projection target contained in the captured image acquired by the acquirer and an image captured position of the region in the captured image, and a controller that determines a projection range over which the projection section projects light and a wavelength band of the light to be projected over the projection range based on the region and the image captured position identified by the identifier and controls the projection section to cause the projection section to project light in the determined wavelength band over the determined projection range.

According to the configuration described above, a region of the projection target can be identified, and the light in the wavelength band according to the identified region can be projected by the projection apparatus. A function of the projection target can therefore be controlled by the light projected by the projection apparatus.

In the aspect of the invention, the controller may determine the projection range over which the projection section projects light and the wavelength band of the light to be projected over the projection range based on a first setting that sets the region and the wavelength band of the light to be projected on the region and a second setting that relates an image captured position in the captured image to a projection range over which the light is projected.

According to the configuration described above, a region of the projection target can be identified based on the captured image, and light in the wavelength band set for the identified region can be projected. A function of the projection target can therefore be controlled by the light projected by the projection apparatus.

In the aspect of the invention, in a case where the projection target is a plant and the identifier identifies a flower bud of the plant as the region, the controller may control the projection section to cause the projection section to project blue light over a projection range corresponding to an image captured position of the flower bud.

According to the configuration described above, in the case where a flower bud of the plant is identified based on the captured image, blue light can be projected over the area corresponding to the identified flower bud. Light having a color effective in differentiation of a flower bud can therefore be projected on the flower bud.

In the aspect of the invention, in a case where the identifier identifies a leaf of the plant as the region, the controller may control the projection section to cause the projection section to project red light over a projection range corresponding to an image captured position of the leaf.

According to the configuration described above, in the case where a leaf of the plant is identified based on the captured image, red light can be projected over the area corresponding to the identified leaf. The growth of the leaf can therefore be facilitated.

In the aspect of the invention, the projection apparatus may further include a detection section that detects a temperature as an environment around the projection target, and the controller may control the projection section based on the temperature detected by the detection section to cause the projection section to project infrared light onto the projection target.

According to the configuration described above, infrared light is projected onto the projection target based on the temperature detected by the detection section. The temperature around the projection target can therefore be maintained at a temperature adequate for the function of the projection target.

In the aspect of the invention, the controller may control the projection section to cause the projection section to project at least one of infrared light and ultraviolet light onto the projection target.

According to the configuration described above, the function of the projection target can therefore be facilitated by projecting the infrared light onto the plant. Further, projecting the ultraviolet light onto the plant can prevent noxious insects from approaching the plant.

In the aspect of the invention, the projection section may include a modulator that modulates the light outputted from the light source section, and a light separator that separates the light outputted from the light source section into light fluxes in a plurality of wavelength bands and outputs light in the wavelength band selected by the controller out of the light fluxes in the plurality of separated wavelength bands to the modulator.

According to the configuration described above, the light outputted from the light source section can be separated into light fluxes in a plurality of wavelength bands. The number of light sources incorporated in the projection apparatus can therefore be reduced.

In the aspect of the invention, the light source section may include a visible light source that emits visible light, an infrared light source that emits infrared light, an ultraviolet light source that emits ultraviolet light, and a light source driver that drives the visible light source, the infrared light source, and the ultraviolet light source, and the controller may control the light source driver to cause the light source driver to selectively drive any of the visible light source, the infrared light source, and the ultraviolet light source so that the driven light source projects light in the determined wavelength band.

According to the configuration described above, light from a light source that emits light in the wavelength band corresponding to the identified region can be projected on the projection target.

Another aspect of the invention is directed to a projection system including an imaging apparatus that captures an image of a projection target, a plurality of projection apparatuses that project light fluxes in different wavelength bands, and a management apparatus including a communication section and a control section that determines the projection apparatus that projects light on the projection target based on a captured image received from the imaging apparatus via the communication section, and the control section identifies a region of the projection target contained in the acquired captured image and an image captured position of the region in the captured image, determines a projection range over which the projection apparatus projects light and a wavelength band of the light to be projected over the projection range based on the identified region and image captured position, and notifies the projection apparatus that projects light in the determined wavelength band of the determined projection range.

According to the configuration described above, a region of the projection target can be identified, and the light in the wavelength band according to the identified region can be projected by the projection apparatus. A function of the projection target can therefore be controlled by the light projected by the projection apparatus.

In the aspect of the invention, the control section identifies a captured region and an image captured position of the region in the captured image, determines a projection range over which light is projected and a wavelength band of the light to be projected over the projection range based on the identified region and image captured position, and notifies the projection apparatus that projects light in the determined wavelength band of the determined projection range for each of the plurality of projection targets contained in the captured image.

According to the configuration described above, a region of a plant can be identified, and the light in the wavelength band according to the identified region can be projected by the projection apparatus. A function of the projection target can therefore be controlled by the light projected by the projection apparatus.

Another aspect of the invention is directed to a method for controlling a projection apparatus including a light source section and a projection section that projects light outputted from the light source section, the method including acquiring a captured image containing a captured projection target, identifying a region of the projection target contained in the acquired captured image and an image captured position of the region in the captured image, determining a projection range over which the projection section projects light and a wavelength band of the light to be projected over the projection range based on the identified region and image captured position, and controlling the projection section to cause the projection section to project light in the determined wavelength band over the determined projection range.

According to the configuration described above, a region of the projection target can be identified, and the light in the wavelength band according to the identified region can be projected by the projection apparatus. A function of the projection target can therefore be controlled by the light projected by the projection apparatus.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will be described below with reference to the drawings.

First Embodiment

Figure 1:
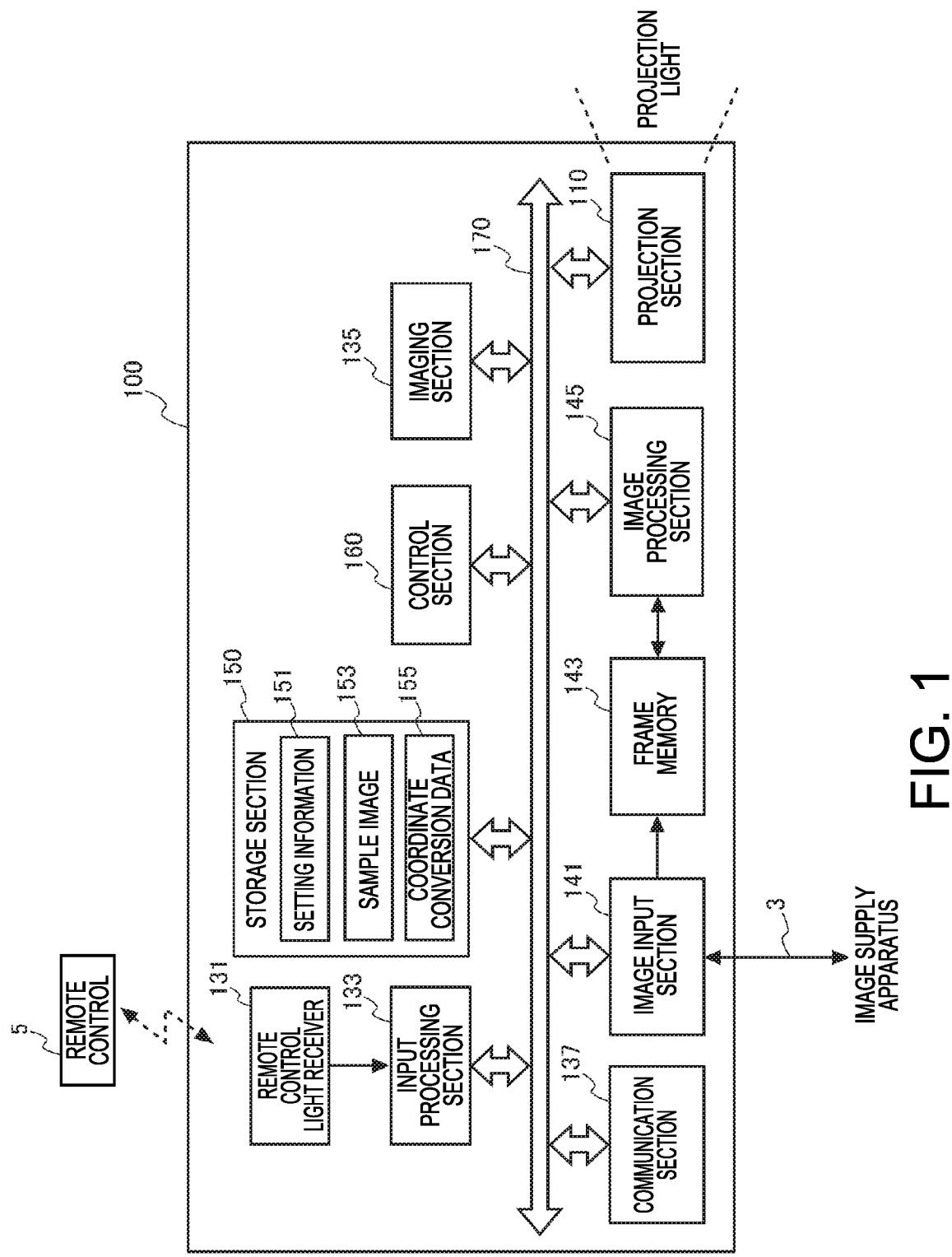
FIG. 1 is a block diagram showing the configuration of a projection apparatus according to a first embodiment.

FIG. 1 is a block diagram showing the configuration of a projection apparatus 100 according to a first embodiment.

The projection apparatus 100 is an apparatus that produces image light and projects the produced image light on a projection target. The image light is a light flux that, when projected on the projection target, displays an image thereon. The projection target on which the projection apparatus 100 projects image light may be a flat surface, a curved surface, or an irregular surface.

The present embodiment is an example in which the projection target of the projection apparatus 100 is a plant. The projection apparatus 100 includes an imaging section 135, identifies a region of the plant, which is the projection target, based on captured image data produced by the imaging section 135, and projects light (projection light) in a wavelength band corresponding to the identified region on the identified region. The region of the plant includes, for example, flowers (including petals and flower buds), leaves, stems, and fruits. Identifying a region of a plant and projecting light in a specific wavelength band, such as visible light, ultraviolet light, and infrared light, provides the effect of facilitating the growth of the plant, conversely delaying the growth of the plant, or withering an unnecessary plant.

The projection apparatus 100 includes a projection section 110, which projects the image light on the projection target. The projection section 110 will be described later in detail.

The projection apparatus 100 includes a remote control light receiver 131 and an input processing section 133. The remote control light receiver 131 is connected to the input processing section 133. The input processing section 133 is connected to the remote control light receiver 131 and a bus 170.

The remote control light receiver 131 receives an infrared signal transmitted from a remote control 5. The remote control 5 includes a variety of buttons and transmits an infrared signal in correspondence with operation performed on any of the buttons.

The remote control light receiver 131 receives the infrared signal transmitted from the remote control 5 and outputs the received infrared signal to the input processing section 133. The input processing section 133 decodes the inputted infrared signal to produce an operation signal representing the content of the operation performed on the remote control 5 and outputs the operation signal to a control section 160.

The projection apparatus 100 includes the imaging section 135. The imaging section 135 is connected to the bus 170 and acts under the control of the control section 160. The imaging section 135 includes a CCD (charge coupled device) sensor, a CMOS (complementary metal oxide semiconductor) sensor, or any other imaging device (none of them is shown), produces captured image data containing a captured subject, and outputs the captured image data to the control section 160. The imaging section 135 further has the function of capturing an infrared image. The control section 160 can sense the temperature around the imaging target based on the captured image data produced by the imaging section 135. The imaging section 135 and the control section 160 act as the "detection section" of an aspect of the invention.

The projection apparatus 100 includes a communication section 137. The communication section 137 is connected to the bus 170 and acts under the control of the control section 160. The communication section 137 includes an antenna, an RF (radio frequency) circuit, and other components (none of them is shown) and wirelessly communicates with an external apparatus under the control of the control section 160.

The projection apparatus 100 includes an image input section 141. The image input section 141 includes a connector for wired connection and an interface circuit corresponding to the connector (neither of them is shown). The image input section 141 is connected to an image supply apparatus that supplies the projection apparatus 100 with image data via a cable 3. The image input section 141 develops the image data received from the image supply apparatus in a frame memory 143 under the control of the control section 160.

The projection apparatus 100 includes an image processing system. The image processing system is formed primarily of the control section 160, which oversees and controls the entire projection apparatus 100, and further includes an image processing section 145 and a storage section 150. The control section 160, the image processing section 145, and the storage section 150 are connected to each other via the bus 170 in a data communicable manner.

The frame memory 143 has storage capacity large enough to develop image data, and the image data is developed in the frame memory 143. The frame memory 143 can be formed, for example, of an SDRAM (synchronous dynamic random access memory).

The image processing section 145 performs image processing on the image data developed in the frame memory 143. Examples of the processes carried out by the image processing section 145 include a resolution conversion (scaling) process or a resizing process, a shape correction process, such as distortion correction, a digital zooming process, a color tone correction process, and a luminance correction process. The image processing section 145 reads the image data having undergone the image processing from the frame memory 143 and outputs the image data to a light modulator driver 122 (see FIG. 2).

The storage section 150 is an auxiliary storage device, for example, a hard disk drive. The storage section 150 may be replaced with a DRAM (dynamic RAM) or a device that allows large-capacity information storage, such as a flash memory and an optical disk including a CD (compact disc), a DVD (digital versatile disc), and a BD (Blu-ray (registered trademark) disc). The storage section 150 stores a control program executed by the control section 160 and a variety of data, such as parameters used in the image processing performed by the image processing section 145. The storage section 150 further stores image data to be projected by the projection apparatus 100 onto the projection target.

The storage section 150 further stores setting information 151, sample images 153, and coordinate conversion data 155.

The setting information 151 contains information that sets a region of a plant and a wavelength band or a color of the light projected on the region. The setting information 151 contains the information that sets a region of a plant and a wavelength band or a color of the light for each growth process of the plant. Therefore, the same region of a plant can be irradiated with light that has a different color or belongs to a different wavelength band in accordance with the growth process of the plant. The growth process of a plant includes, for example, budding, flower-bud formation, flowering, and fruiting. The budding is a state in which a seed buds. The flower-bud formation is a state in which a stem or a branch of the plant buds eventually followed by flowering. As an example of the setting information 151, the setting information 151 is, for example, so set that red light is projected over an entire plant when the state of the plant is the budding state, and red light is projected on the leaves and blue light is projected on the flower buds when the state of the plant is the flower-bud formation state. The setting information corresponds to the "first setting" in an aspect of the invention.

The sample images 153 are each an image for identifying a target region of a plant from the captured image data produced by the imaging section 135, and a plurality of sample images are prepared for each type of plant and for each region of a plant and stored in the storage section 150.

The control section 160, for example, performs pattern matching between captured image data produced by the imaging section 135 and the sample image 153 to identify a region of the plant captured and contained in the captured image data. To identify a region of the plant from the captured image data, information representing characteristics of each region of the plant can be stored in the storage section 150. The information representing characteristics of each region of a plant includes the shape and color of the region and the position of the region in the entire plant, and other pieces of information.

The coordinate conversion data 155 is information that relates the captured image data to an area in the frame memory 143.

For example, set the upper left corner of rectangular captured image data to be an origin, and set axes x and y to extend horizontally and vertically, respectively. Similarly, set the upper left corner of the frame memory 143 to be an origin, and set axes x and y to extend horizontally and vertically, respectively. In this case, the coordinate conversion data 155 is conversion data for converting a coordinate (x, y) in the captured image data into a coordinate (X, Y) in the frame memory 143. The coordinate conversion data 155 is produced by the manufacturer of the projection apparatus 100 and stored in the storage section 150 when the projection apparatus 100 is shipped as a product. The coordinate conversion data 155 corresponds to the "second setting" in an aspect of the invention.

The control section 160 includes a CPU, a ROM, and a RAM (none of them is shown) as hardware. The ROM is a nonvolatile storage device, such as a flash ROM, and stores the control program and data. The RAM forms a work area used by the CPU. The CPU reads the control program from the ROM or the storage section 150, develops the control program in the RAM, and executes the developed control program to control each portion of the projection apparatus 100. The control section 160 corresponds to the "acquirer," "identifier," and "controller" in an aspect of the invention.

The control section 160 controls each portion of the projection apparatus 100 to cause the portions to project the projection light on the projection target. In more detail, the control section 160 causes the image processing section 145 to process the image data. In this process, the control section 160 may read a parameter necessary for a process carried out by the image processing section 145 from the storage section 150 and output the parameter to the image processing section 145. The control section 160 controls a light source driver 121 (see FIG. 2) to cause it to turn on and off a light source in a light source section 111 and adjust the luminance of the light from the light source. The control section 160 further controls a zoom mechanism in a projection system 114 to cause it to enlarge or reduce the image light and controls a focus adjustment mechanism for focus adjustment.

Figure 2:
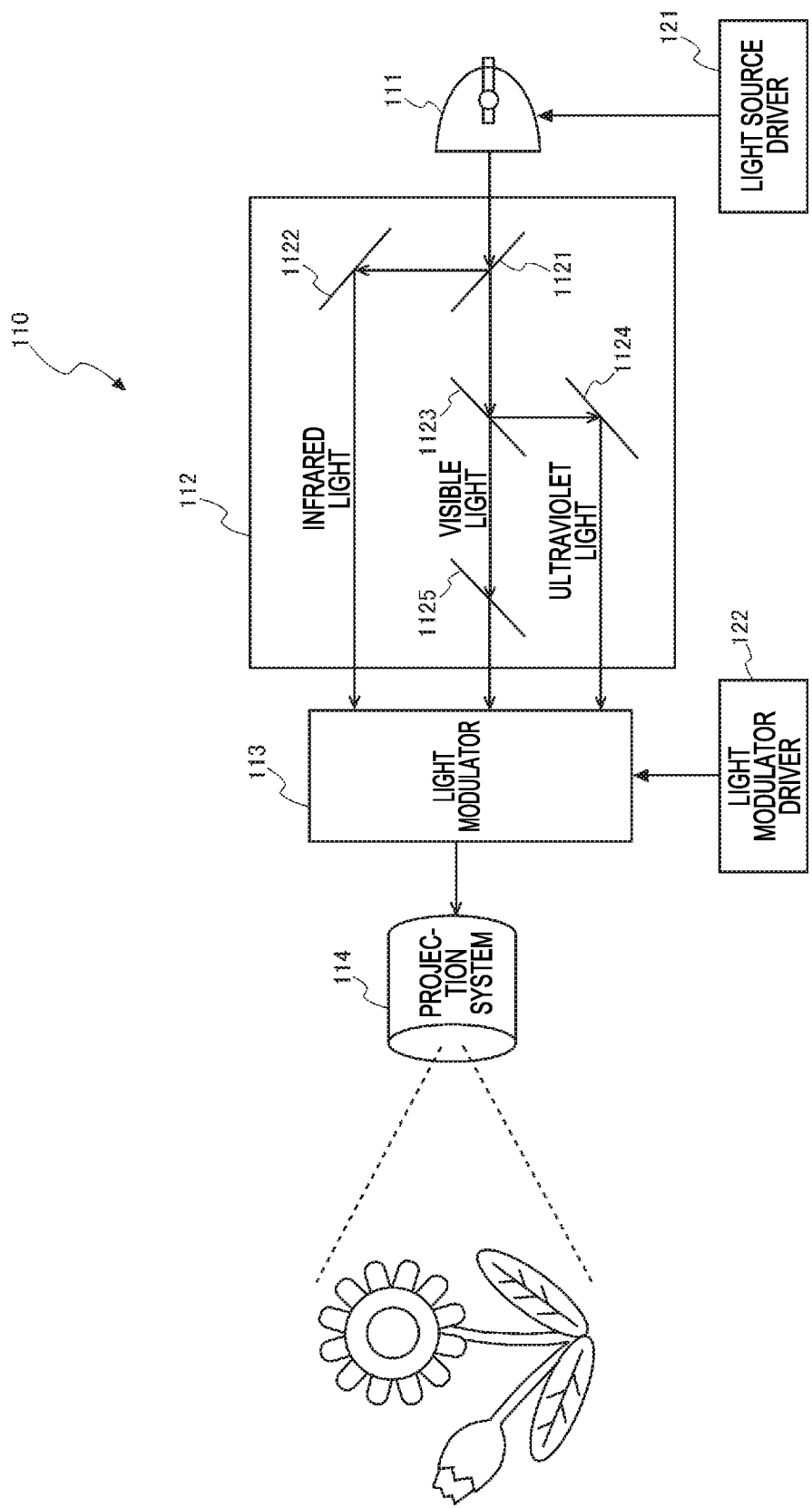
FIG. 2 is a configuration diagram showing the configuration of a light separator.

FIG. 2 is a configuration diagram showing the configuration of the projection section 110.

The configuration of the projection section 110 provided in the projection apparatus 100 will be described with reference to FIG. 2. In the present embodiment, the projection section 110 includes the light source section 111, a light separator 112, a light modulator 113, the light source driver 121, the light modulator driver 122, and the projection system 114. The light modulator 113 corresponds to the "modulator" in an aspect of the invention.

In the present embodiment, the light source section 111 includes a light source that emits light containing white light, infrared light, and ultraviolet light. The light source can, for example, be an ultrahigh-pressure mercury lamp, a metal halide lamp, a xenon lamp, or a halogen lamp. The light source section 111 may further include a reflector and an auxiliary reflector that guide the light emitted by the light source to the light modulator 113. The light source section 111 can further include a lens group for enhancing the optical characteristics of the projection light, a polarizer, a light adjusting element that is disposed in the path leading to the light modulator 113 and attenuates the amount of the light emitted by the light source, or any other component (none of the components described above is shown).

The light source section 111 is driven by the light source driver 121. The light source driver 121 is connected to the bus 170 and turns on and off the light source in the light source section 111 in accordance with an instruction from the control section 160 (which will be described later), which is also connected to the bus 170.

The light separator 112 includes a first dichroic mirror 1121, a first reflection mirror 1122, a second dichroic mirror 1123, a second reflection mirror 1124, and a third reflection mirror 1125.

The light separator 112 separates the light outputted from the light source section 111 into infrared light, visible light, and ultraviolet light. The light separator 112 selectively causes the separated infrared light, visible light, and ultraviolet light to enter the light modulator 113 under the control of the control section 160.

The light outputted from the light source section 111 is incident on the first dichroic mirror 1121. The first dichroic mirror 1121 is spectrally characterized by transmitting the ultraviolet light and the visible light and reflecting the infrared light. Therefore, out of the light outputted from the light source section 111, the ultraviolet light and the visible light pass through the first dichroic mirror 1121, and the infrared light is reflected off the first dichroic mirror 1121.

The infrared light reflected off the first dichroic mirror 1121 is incident on the first reflection mirror 1122. The projection apparatus 100 includes a driver (not shown) that drives the first reflection mirror 1122. The driver includes a stepper motor, a gear, a drive circuit that drives the stepper motor, and other components (none of them is shown). When the drive circuit drives the stepper motor to rotate, a single or a plurality of gears rotate in response to the rotation of the output shaft of the stepper motor to drive the first reflection mirror 1122. When the first reflection mirror 1122 is driven, the angle of reflection performed by the first reflection mirror 1122 is changed. The control section 160 controls the driver to cause it to adjust the angle of reflection performed by the first reflection mirror 1122. As a result, the direction in which the infrared light is reflected off the first reflection mirror 1122 is changed to a first direction or a second direction. The first direction is the direction in which the infrared light reflected off the first reflection mirror 1122 enters the light modulator 113. The second direction is the direction in which the infrared light reflected off the first reflection mirror 1122 does not enter the light modulator 113.

The ultraviolet light and the visible light having passed through the first dichroic mirror 1121 are incident on the second dichroic mirror 1123. The second dichroic mirror 1123 is spectrally characterized by transmitting the visible light and reflecting the ultraviolet light. Therefore, out of the light incident on the second dichroic mirror 1123, the visible light passes through the second dichroic mirror 1123, and the ultraviolet light is reflected off the second dichroic mirror 1123.

The ultraviolet light reflected off the second dichroic mirror 1123 is incident on the second reflection mirror 1124. The projection apparatus 100 includes a driver (not shown) that drives the second reflection mirror 1124. The driver includes a stepper motor, a gear, a drive circuit that drives the stepper motor, and other components (none of them is shown). When the drive circuit drives the stepper motor to rotate, a single or a plurality of gears rotate in response to the rotation of the output shaft of the stepper motor to drive the second reflection mirror 1124. When the second reflection mirror 1124 is driven, the angle of reflection performed by the second reflection mirror 1124 is changed. The control section 160 controls the driver to cause it to adjust the angle of reflection performed by the second reflection mirror 1124. As a result, the direction in which the ultraviolet light is reflected off the second reflection mirror 1124 is changed to a third direction or a fourth direction. The third direction is the direction in which the ultraviolet light reflected off the second reflection mirror 1124 enters the light modulator 113. The fourth direction is the direction in which the ultraviolet light reflected off the second reflection mirror 1124 does not enter the light modulator 113.

The visible light having passed through the second dichroic mirror 1123 is incident on the third reflection mirror 1125. The projection apparatus 100 includes a driver (not shown) that drives the third reflection mirror 1125.

The driver includes a stepper motor, a gear, a drive circuit that drives the stepper motor, and other components (none of them is shown). When the drive circuit drives the stepper motor to rotate, a single or a plurality of gears rotate in response to the rotation of the output shaft of the stepper motor to drive the third reflection mirror 1125. When the third reflection mirror 1125 is driven, the angle of reflection performed by the third reflection mirror 1125 is changed. The control section 160 controls the driver to cause it to adjust the angle of reflection performed by the third reflection mirror 1125. As a result, the direction in which the visible light is reflected off the third reflection mirror 1125 is changed to a fifth direction or a sixth direction. The fifth direction is the direction in which the visible light reflected off the third reflection mirror 1125 enters the light modulator 113. The sixth direction is the direction in which the visible light reflected off the third reflection mirror 1125 does not enter the light modulator 113.

In the present embodiment, the light modulator 113 includes three liquid crystal panels corresponding to the infrared light, the visible light, and the ultraviolet light. The light fluxes separated by the light separator 112 are incident on the corresponding liquid crystal panels. The three liquid crystal panels are each a transmissive liquid crystal panel and modulate light passing therethrough to produce image light. The modulated image light fluxes having passed through the liquid crystal panels are combined with one another by a light combining system, such as a cross dichroic prism, and the combined light is outputted to the projection system 114. In the modulation described above, the image light is so modulated as to have a shape corresponding to the shape of a region of the plant. The modulated ultraviolet light or infrared light passes through the light combining system and is outputted to the projection system 114.

In a case where the visible light is desired to be further separated and projected, a color separation system that separates the visible light into three RGB color light fluxes and liquid crystal panels corresponding to the three colors are provided.

The light modulator 113 is driven by the light modulator driver 122. Image data corresponding to the infrared light, the visible light (RGB three primary colors), and the ultraviolet light are inputted from the image processing section 145, which will be described later, to the light modulator driver 122. The light modulator driver 122 converts the image data inputted thereto into data signals suitable for the actions of the liquid crystal panels. The light modulator driver 122 applies voltage to each pixel of each of the liquid crystal panels based on the corresponding converted data signal to draw an image on the liquid crystal panel.

The projection system 114 includes a lens group that projects the modulated image light fluxes from the light modulator 113 onto the projection target to form images thereon. The projection system 114 may further include a zoom mechanism that enlarges or reduces the images formed by the image light fluxes projected on the projection target and a focus adjustment mechanism that adjusts focusing.

Figure 3:
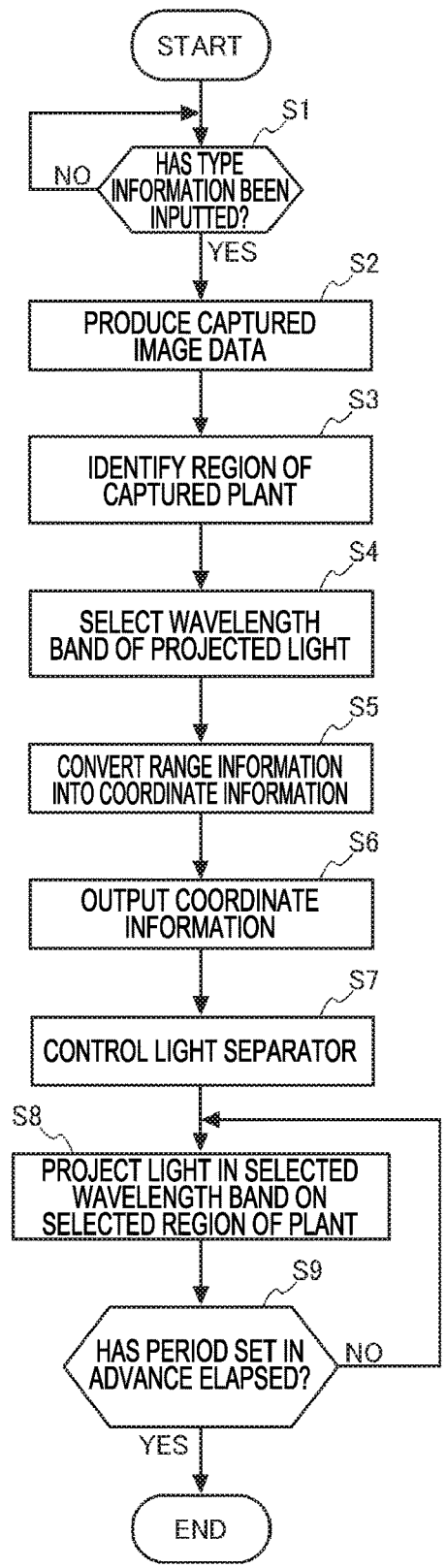
FIG. 3 is a flowchart showing the action of the projection apparatus.

A description will next be made of the action of the projection apparatus 100 in a case where a region of a plant is identified and light in a wavelength band corresponding to the identified region is projected on the identified region. FIG. 3 is a flowchart showing the action of the projection apparatus 100.

The control section 160 first accepts an input of type information the plant that is the target on which the projection light is projected (step S1). The type information is, for example, information that identifies the plant, such as a dandelion and a sunflower. A user inputs the type of a target plant, for example, by operating the remote control 5. In a case where the control section 160 has accepted no input of the type information of the plant (NO in step S1), the control section 160 waits until it accepts an input.

When the control section 160 accepts an input of the type information (YES in step S1), the control section 160 causes the imaging section 135 to perform imaging to produce captured image data (step S2). The produced captured image data contains a captured image of the target plant. The captured image data is stored in the storage section 150.

The control section 160 acquires captured image data from the storage section 150 and identifies a region of the plant contained in the acquired captured image data (step S3). When the control section 160 acquires the captured image data from the storage section 150, the control section 160 acts as the "acquirer." When the control section 160 identifies a region of the plant contained in the captured image data, the control section 160 acts as the "identifier." The control section 160 further acquires the sample image 153 corresponding to the type information accepted in step S1 from the storage section 150. The control section 160 acquires, as the sample image 153, captured image data containing each region of the plant corresponding to the type information.

The control section 160 first analyzes the acquired captured image data to extract an area containing the captured plant (hereinafter referred to as "plant area"). The extraction of the plant area may be so performed that an area drawn in a color set in advance, such as green, is extracted as the plant area or the plant area is identified and extracted based on the color, shape, and other factors of the plant corresponding to the type information accepted in step S1.

The control section 160 then divides the extracted plant area into a plurality of areas. For example, the control section 160 divides the plant area into a plurality of areas having the same or similar color. The areas produced by the dividing operation are each called a divided area.

The control section 160 then performs pattern matching between the images in the plurality of divided areas and a plurality of sample images 153 to determine the degree of coincidence for each combination thereof. In the description, the control section 160 calculates the degree of coincidence between each of the divided areas and each of the sample images 153. Having calculated the degree of coincidence with each of the sample images 153, the control section 160 decides the sample image 153 having the highest degree of coincidence for each of the divided areas. The control section 160 decides the region of the plant contained in the decided sample image 153 as the region of the plant contained in the image in the divided area.

The control section 160 then determines an area on which the light is projected and a wavelength band of the light projected on the area.

The control section 160 first acquires range information representing the range of the divided areas having been decided to contain the same region of the plant. The range information is coordinate information representing positions in the captured image data. The control section 160 sets a new area representing the collective range of the divided areas having been decided to contain the same region. The newly set area is called a region area. For example, in a case where there are a plurality of "petal" divided areas, the control section 160 sets the areas formed of the plurality of divided areas to be a petal region area. In a case where there is only one "petal" divided area, the control section 160 sets the divided area to be the "petal" region area. The range information representing the range of the region area corresponds to the "image captured position of the region in the captured image" in an aspect of the invention.

Having set the region area for each region of the plant, the control section 160 then refers to the setting information 151 to set a wavelength band of the light to be projected on the region area. In a case where the visible light wavelength band is selected as the wavelength band of the light, the control section 160 also sets the color of the visible light, such as red and blue.

The control section 160 then selects one wavelength band of the light to be projected on the plant from the wavelength bands of the infrared light, the ultraviolet light, and the visible light (step S4) and selects a region area on which the light of the selected wavelength band is projected. The following description will be made of a case where the number of wavelength bands of light fluxes to be simultaneously projected on the plant is one. Instead, light fluxes in a plurality of wavelength bands may be projected simultaneously on the plant.

The control section 160 then uses the coordinate conversion data 155 to convert the range information representing the range of the selected region areas into coordinate information in the frame memory 143 (step S5) and outputs the converted coordinate information to the image processing section 145 (step S6). The coordinate information in the frame memory 143 corresponds to the "projection range" in an aspect of the invention.

The image processing section 145 develops data representing grayscales set in advance in a range of the frame memory 143 that is the range indicated by the coordinate information inputted from the control section 160. The area of the frame memory 143 where the data representing the grayscales set in advance are developed is the area of the corresponding liquid crystal panel where the light from the light source section 111 passes through and the light is projected on the plant. The area of the frame memory 143 where the data representing the grayscales set in advance are not developed is the area of the corresponding liquid crystal panel where the light from the light source section 111 is blocked and the light is not projected on the plant.

The control section 160 controls the light separator 112 in such a way that the light in the selected wavelength band out of the light outputted from the light source section 111 enters the light modulator 113 (step S7).

For example, to cause the visible light to enter the light modulator 113, the control section 160 adjusts the angle of reflection performed by the first reflection mirror 1122 to cause the infrared light to be reflected in the second direction. The control section 160 adjusts the angle of reflection performed by the second reflection mirror 1124 to cause the ultraviolet light to be reflected in the fourth direction. The control section 160 further adjusts the angle of reflection performed by the third reflection mirror 1125 to cause the visible light to be reflected in the fifth direction. The control section 160 thus controls the light separator 112 to cause the light in the selected wavelength band out of the light outputted from the light source section 111 to enter the light modulator 113.

Having developed the data in the frame memory 143, the image processing section 145 outputs the developed data to the light modulator driver 122. The light modulator driver 122 converts the data inputted thereto into data signals suitable for the actions of the liquid crystal panels. The light modulator driver 122 applies voltage to each pixel of each of the liquid crystal panels based on the corresponding converted data signal to draw an image on the liquid crystal panel. The images drawn on the liquid crystal panels are each an image corresponding to the shape of a region of the plant that is the region on which the light in the selected wavelength band is projected.

In a case where the visible light is projected on the plant and only selected color light (blue light, for example) out of the visible light is projected on the plant, the light modulator driver 122 drives the liquid crystal panels in such a way that the liquid crystal panels corresponding to red and green each do not transmit the red or green light.

When an image corresponding to the shape of the region of the plant is drawn on each of the liquid crystal panels, and the light in the selected wavelength band enters the light modulator 113, the light in the selected wavelength band is projected on the corresponding region of the plant (step S8).

The control section 160 then decides whether or not a period set in advance has elapsed (step S9). The period set in advance is preferably set to be an expected period for which the shape or position of the identified region of the plant does not change. The period set in advance may instead be set to be an expected period until which the shape or position of the identified region of the plant changes greatly due to an effect of the growth of the plant itself or the surrounding environment.

When the control section 160 decides that the period set in advance has not elapsed (NO in step S9), the control section 160 returns to step S8, where the light in the selected wavelength band is projected on the corresponding region of the plant. When the control section 160 decides that the period set in advance has elapsed (YES in step S9), the control section 160 terminates the action in the flowchart.

Figure 4:
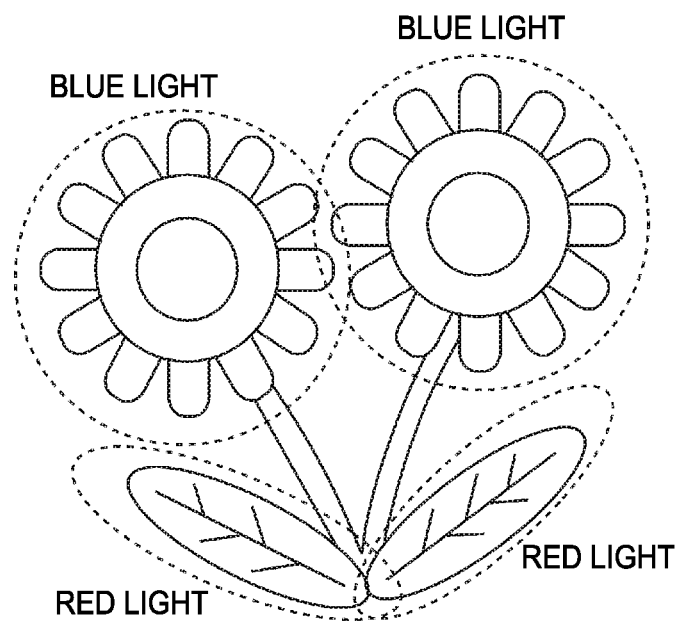
FIG. 4 shows a state in which light is projected on a plant.

FIG. 4 shows an example of the projection ranges in a case where the projection apparatus 100 projects the visible light on a plant.

It is believed in the growth of a plant that it is effective to irradiate red light that facilitates the growth and blue light that facilitates differentiation of a flower-bud and other regions. After the budding of the plant and in the growth period thereof, the projection apparatus 100 projects the red light over the entire plant, and when a flower bud is detected in the growth period, the projection apparatus 100 projects red light on the leaves and blue light on the flower bud. The irradiation can therefore be performed in accordance with the growth of the plant, whereby light more appropriate for the state of the growth of the plant can be projected than in a method of related art.

Figure 5:
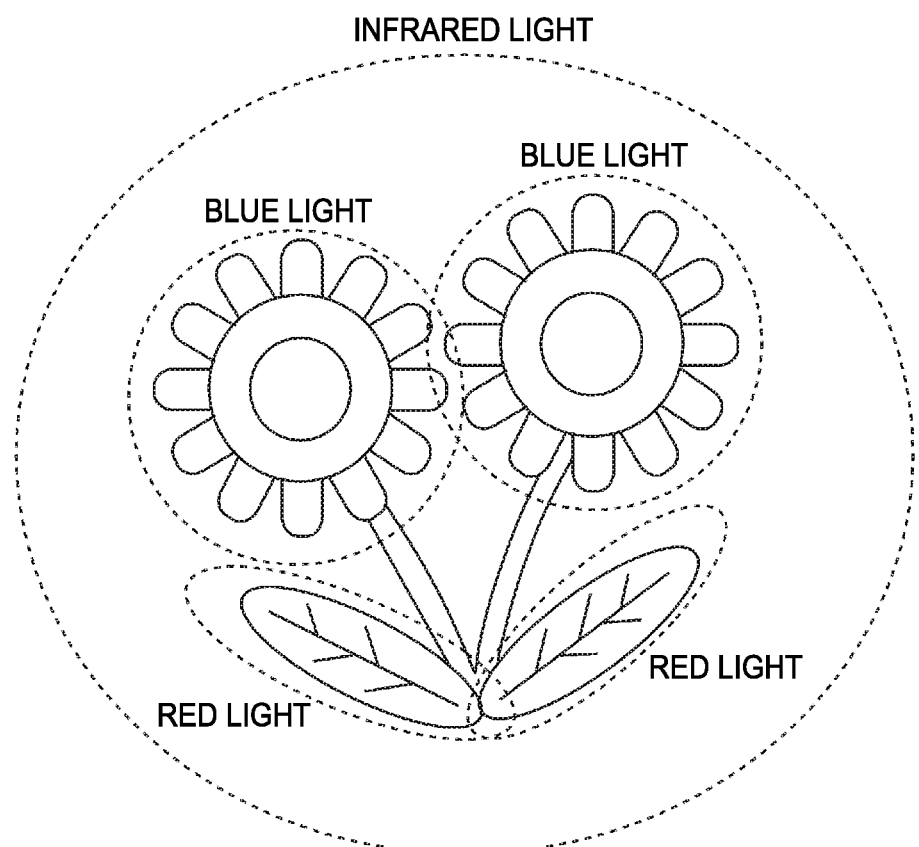
FIG. 5 shows another state in which light is projected on the plant.

FIG. 5 shows an example of the projection ranges in a case where the projection apparatus 100 projects the visible light and the infrared light on the plant.

The control section 160, as the surrounding environment, detects the temperature around a target plant based on an infrared light image captured by the imaging section 135. The control section 160 may instead be configured to receive information on the temperature measured by an external apparatus via the communication section 137. Further, a pyrometer (radiation thermometer) may be incorporated in the projection apparatus 100, and the projection apparatus 100 may measure the temperature around a plant. In a case where the temperature around the plant is lower than a temperature set in advance, the control section 160 projects infrared light to the projection range corresponding to a plant area identified from the captured image data. As a result, the environment around the plant can be more preferable rearing environment.

As described above, the projection apparatus 100 according to the first embodiment includes the light source section 111, the projection section 110, and the control section 160, which acts as the acquirer, the identifier, and the controller.

The projection section 110 projects the light outputted from the light source section 111. The control section 160 acquires captured image data produced by the imaging section 135. The control section 160 identifies a region of the plant contained in the acquired captured image data and the image captured position of the region in the captured image data.

The control section 160 determines the projection range over which the projection section 110 projects the light and the wavelength band of the light projected over the projection range based on the identified region and image captured position. The control section 160 controls the projection section 110 to cause it to project the light of the determined wavelength band over the determined projection range.

Therefore, a region of the plant can be identified, and the light in the wavelength band according to the identified region can be projected by the projection apparatus 100. The growth of the plant can therefore be controlled by the light projected by the projection apparatus 100.

Further, the present embodiment allows light effective in the growth of the plant that is the projection target to be radiated to a corresponding region of the plant even when the position and size of the region are changed due to the growth of the plant with no operation of setting the position and size again, whereby the plant is efficiently allowed to blossom and bear fruit.

Further, the projection apparatus 100 includes the storage section 150. The storage section 150 stores the setting information 151, as the first setting, which sets a region of the plant and a wavelength band of the light to be projected on the region, and the coordinate conversion data 155, which relates an image captured position in the captured image data to a projection range over which the light is projected. The control section 160 determines the projection range over which the projection section 110 projects the light and the wavelength band of the light to be projected over the projection range based on the setting information 151 and the coordinate conversion data 155.

Therefore, a region of the plant can be identified based on the captured image data, and light in the wavelength band set for the identified region can be projected. The growth of the plant can therefore be controlled by the light projected by the projection apparatus 100.

In a case where a flower bud of the plant is identified as the region of the plant, the control section 160 controls the projection section 110 to cause it to project blue light over the projection range corresponding to the image captured position of the flower bud.

Light having a color effective in differentiation of a flower bud can therefore be projected on the flower bud.

In a case where leaves of the plant are identified as the region of the plant, the control section 160 controls the projection section 110 to cause it to project red light over the projection range corresponding to the image captured position of the leaves.

The growth of the leaves of the plant can therefore be facilitated.

The imaging section 135 has the function of capturing infrared light, and the control section 160 detects the temperature around the projection apparatus 100 based on an image captured by the imaging section 135. The control section 160 controls the projection section 110 based on the detected temperature to cause it to project infrared light onto the plant.

The growth of the plant can therefore be facilitated by projecting the infrared light onto the plant. Further, projecting ultraviolet light onto the plant can prevent noxious insects from approaching the plant.

The projection section 110 includes the light modulator 113 and the light separator 112.

The light modulator 113 modulates the light outputted from the light source section 111.

The light separator 112 separates the light outputted from the light source section 111 into light fluxes in a plurality of wavelength bands and outputs light in a wavelength band selected by the control section out of the plurality of separated wavelength bands to the light modulator 113.

The number of light sources incorporated in the projection apparatus 100 can therefore be reduced.

Second Embodiment

Figure 6:
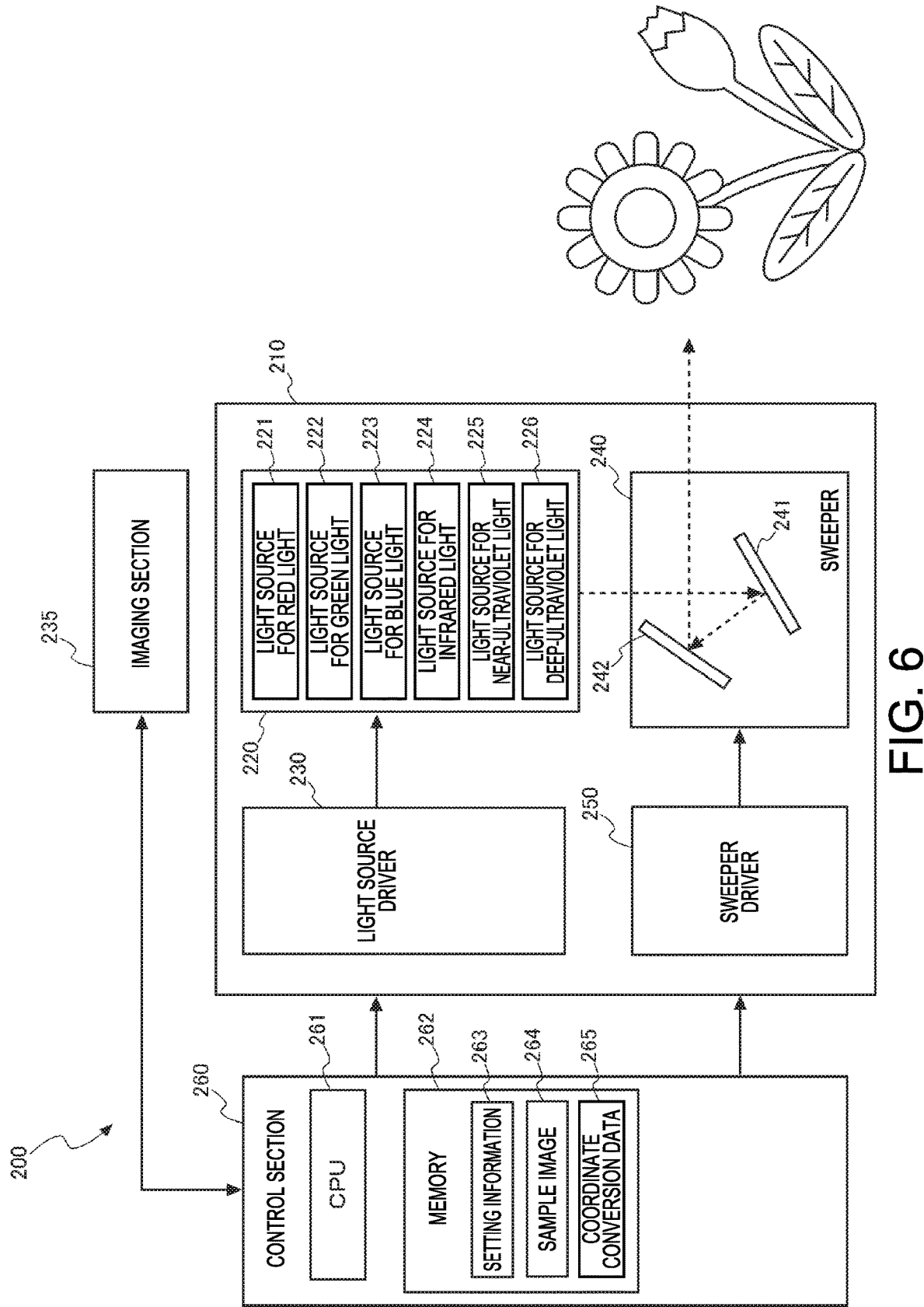
FIG. 6 is a block diagram showing the configuration of a projection apparatus according to a second embodiment.

FIG. 6 is a configuration diagram showing the configuration of a control section 260, a projection section 210, and an imaging section 235 of a projection apparatus 200 according to a second embodiment. The projection apparatus 200 is characterized by the detailed configuration of the projection section 210, and the other configurations of the projection apparatus 200 can be the same as those in the first embodiment. Although not shown in FIG. 6, the portions provided in the projection apparatus 200 are connected to each other via a bus in a data communicable manner, as in the projection apparatus 100 shown in FIG. 1.

The projection section 210 includes a light source section 220, a light source driver 230, a sweeper 240, and a sweeper driver 250.

The imaging section 235 produces captured image data and outputs the captured image data to the control section 260.

The light source section 220 includes a plurality of laser light sources.

The light source section 220 includes a light source for red light 221, a light source for green light 222, a light source for blue light 223, a light source for infrared light 224, a light source for near-ultraviolet light 225, and a light source for deep-ultraviolet light 226. The light source for red light 221, the light source for green light 222, and the light source for blue light 223 correspond to the "visible light source" in an aspect of the invention. The light source for infrared light 224 corresponds to the "infrared light source" in an aspect of the invention. The light source for near-ultraviolet light 225 and the light source for deep-ultraviolet light 226 correspond to the "ultraviolet light source" in an aspect of the invention. The light sources 221 to 226 are each a laser light source, such as a laser diode. The light source driver 230 selectively drives the light sources 221 to 226 in the light source section 220 under the control of the control section 260.

The sweeper 240 includes mirrors, and the mirrors that swing back and forth reflect the laser beams outputted from the light source section 220 to sweep the laser beams. The sweeper driver 250 drives the sweeper 240 under the control of the control section 260.

The sweeper 240 includes a horizontal sweep mirror 241 and a vertical sweep mirror 242. The horizontal sweep mirror 241 is driven by the sweeper driver 250 and reflects the laser beams to sweep the laser beams in the horizontal direction. The vertical sweep mirror 242 is driven by the sweeper driver 250 and reflects the laser beams to sweep the laser beams in the vertical direction. The horizontal sweep mirror 241 and the vertical sweep mirror 242 can each be formed, for example, of a sweep mirror, such as a MEMS (micro electro mechanical system) mirror.

The sweeper driver 250 drives the horizontal sweep mirror 241 back and forth in the horizontal direction in accordance with a drive signal supplied from the control section 260. The sweeper driver 250 drives the vertical sweep mirror 242 back and forth in the vertical direction in accordance with a drive signal supplied from the control section 260.

The control section 260 includes a CPU 261 and a memory 262, and the CPU 261 carries out a process in accordance with a control program stored in the memory 262.

The control section 260 causes the imaging section 235 to perform imaging and acquires captured image data produced by the imaging section 235, as in the first embodiment described above. The control section 260 identifies a plant area containing the captured plant in the acquired captured image data and further identifies the image captured position where each region of the plant is captured.

The memory 262 includes a nonvolatile storage device, such as a flash ROM, and a volatile storage device, such as a DRAM. The memory 262 stores setting information 263, sample images 264, and coordinate conversion data 265, as in the first embodiment.

The control section 260, when it identifies the plant area and further identifies the image captured position of each region of the plant in the captured image data, determines based on the identified information a projection range over which light is projected and a wavelength band of the light to be projected over the projection range to produce setting data. The setting data is data corresponding to one frame of image data projected by the projection apparatus 200. The setting data contains a setting of the projection range over which light is projected and a setting of the wavelength band of the light to be projected over the projection range. The control section 260 stores the produced setting data in the memory 262.

Having produced the setting data, the control section 260 controls the light source driver 230 and the sweeper driver 250 in accordance with the setting data. Specifically, the control section 260 reads the setting data from the memory 262 on a sweep line basis and controls the light source driver 230 in accordance with the read setting data corresponding to the one sweep line to cause the light source that emits light in the set wavelength band out of the light sources 221 to 226 to emit the laser beam.

The control section 260 further controls the sweeper driver 250 in accordance with the read setting data corresponding to the one sweep line. The sweeper driver 250 drives the horizontal sweep mirror 241 to reflect the laser beam outputted from the light source section 220 and drives the vertical sweep mirror 242 to further reflect the light reflected off the horizontal sweep mirror 241. As a result, the light in the determined wavelength band is projected over the projection range determined by the sweep method described above, and on a region of the plant is projected the light in the corresponding wavelength band.

Figure 7:
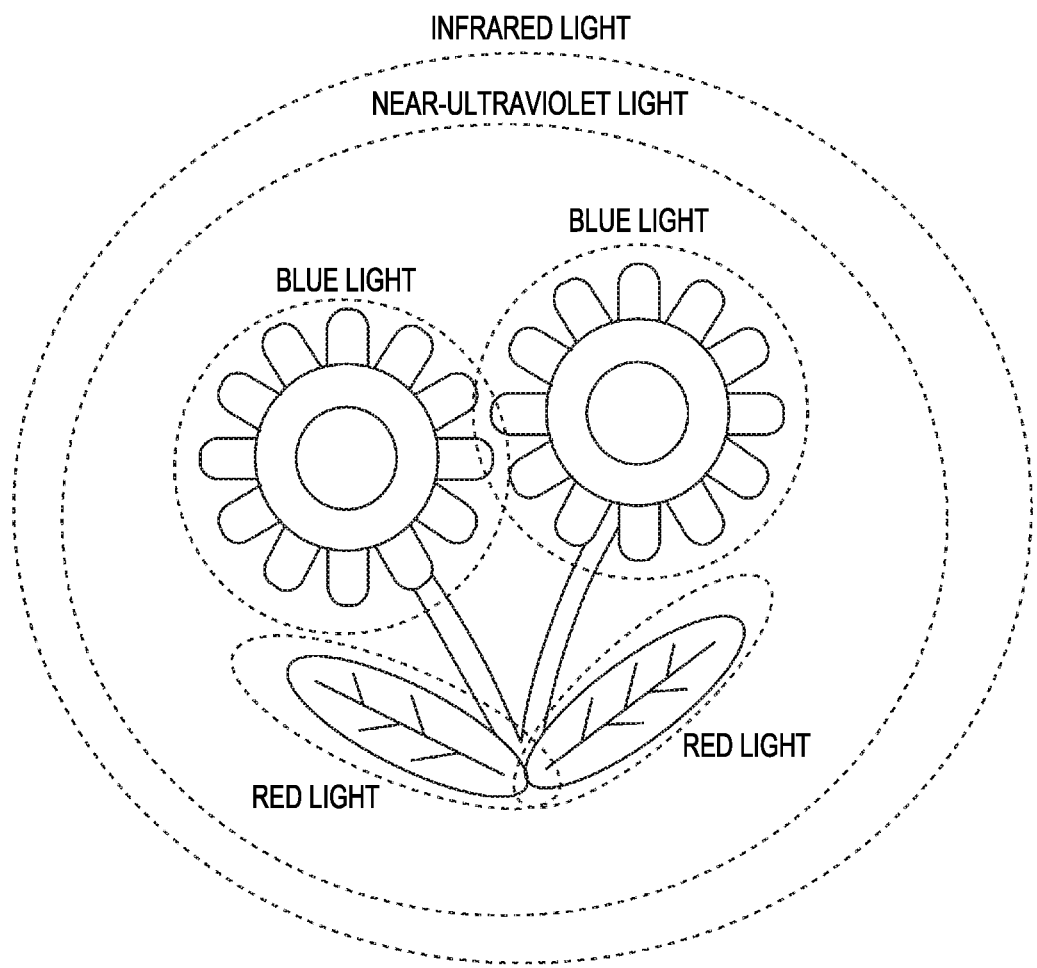
FIG. 7 shows a state in which light is projected on a plant.

FIG. 7 shows an example of the projection ranges in a case where the projection apparatus 200 projects the visible light, the infrared light, and the near-ultraviolet light on a plant.

The projection apparatus 200 projects the near-ultraviolet light over the projection range corresponding to the plant area identified from the captured image data. The environment around the plant can therefore be a more preferable rearing environment. Projecting the near-ultraviolet light on the plant allows projection of light close to natural light on the plant and facilitation of the growth of the plant.

Figure 8:
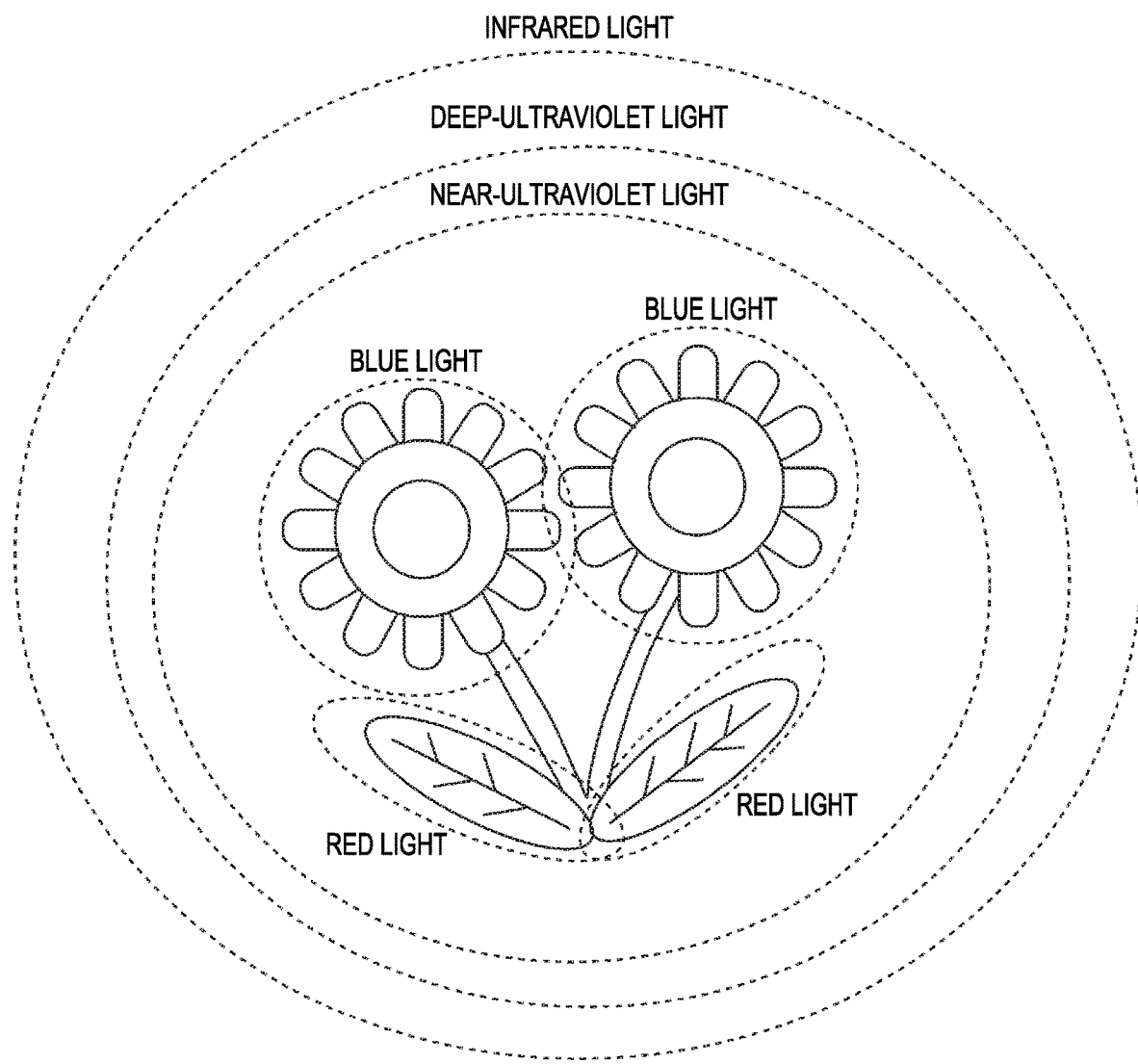
FIG. 8 shows another state in which light is projected on the plant.

FIG. 8 shows an example of the projection ranges in a case where the projection apparatus 200 projects the visible light, the infrared light, the near-ultraviolet light, and the deep-ultraviolet light on the plant.

The projection apparatus 200 projects the deep-ultraviolet light over the projection range corresponding to the plant area identified from the captured image data. Since the deep-ultraviolet light is effective in expelling noxious insects, projecting the deep-ultraviolet light on the plant allows reduction in damage due to insects carrying disease germs.

As described above, the light source section 211 of the projection apparatus 200 according to the second embodiment includes the visible light sources 221 to 223, which emit visible light, the light source for infrared light 224, which emits infrared light, the light sources for ultraviolet light 225 and 226, which emit ultraviolet light, and the light source driver 230. The control section 260 controls the light source driver 230 to cause it to selectively drive the visible light sources 221 to 223, the light source for infrared light 224, and the light sources for ultraviolet light 225 and 226 to project light fluxes that belong to determined wavelength bands.

Light from a light source that emits light in a wavelength band corresponding to an identified region can therefore be projected on a plant.

Third Embodiment

Figure 9:
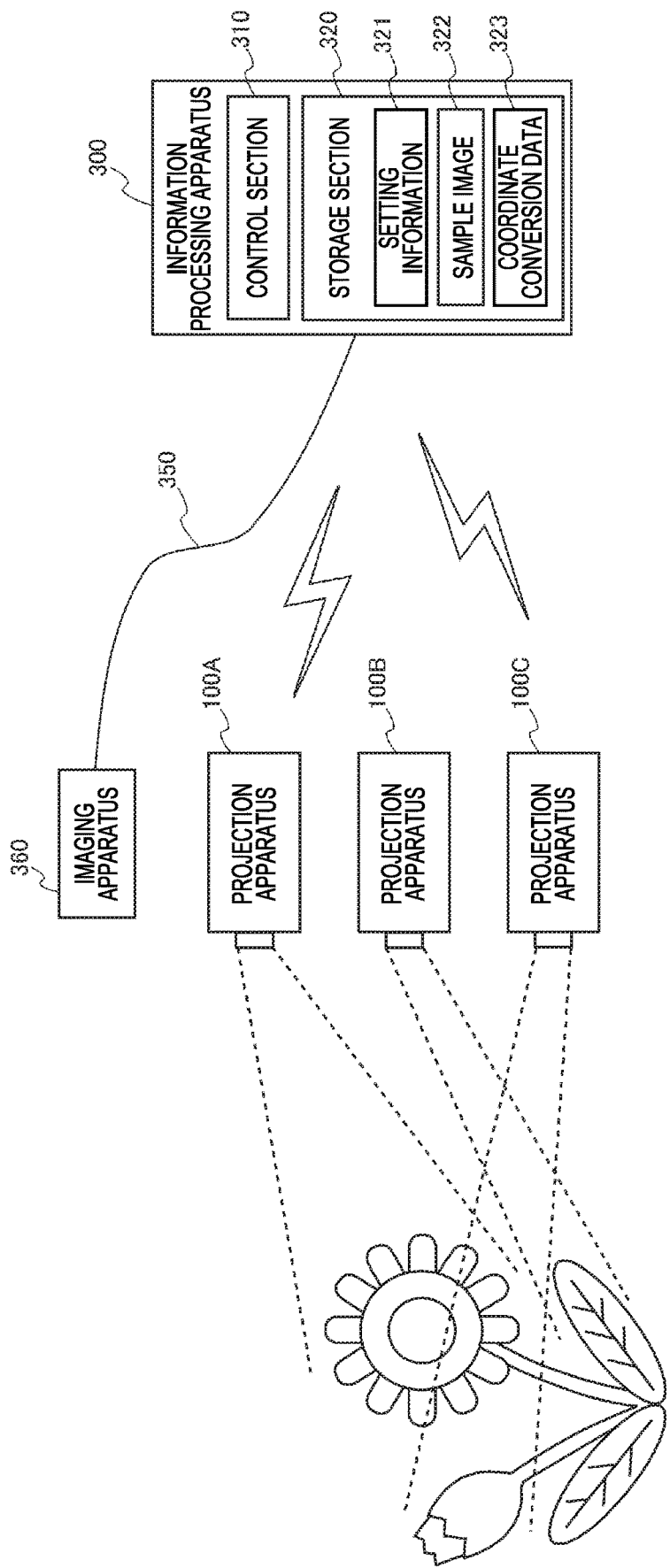
FIG. 9 is a block diagram showing the configuration of a projection apparatus according to a third embodiment.

FIG. 9 shows the configuration of a system according to a third embodiment.

The present embodiment is an embodiment of a projection system including a plurality of projection apparatuses 100, an information processing apparatus 300 as a management apparatus, and an imaging apparatus 360. FIG. 9 shows a case where three projection apparatuses 100, projection apparatuses 100A, 100B, and 100C, are provided, but the number of projection apparatuses 100 is not limited to three. Further, in the present embodiment, the information processing apparatus 300 is connected to the imaging apparatus 360 via a cable 350 and connected to the projection apparatuses 100A to 100C over wireless communication. The connection between the information processing apparatus 300 and the imaging apparatus 360 is not limited to the wired connection via the cable 350 and may instead be wireless connection. Similarly, the connection between the information processing apparatus 300 and the projection apparatuses 100A to 100C is not limited to the wireless connection and may instead be wired connection. The configuration of each of the projection apparatuses 100A, 100B, and 100C is roughly the same as the configuration of the projection apparatus 100 shown in FIG. 1, but the projection apparatuses 100A, 100B, and 100C may each have a configuration including no imaging section 135.

The configuration of each of the projection apparatuses 100A, 100B, and 100C is roughly the same as the configuration of the projection apparatus 100 according to the first embodiment described with reference to FIG. 1 and will therefore not be described in detail.

The projection apparatuses 100A to 100C project light fluxes in different wavelength bands on a plant.

In the present embodiment, the projection apparatus 100A projects visible light on the plant, the projection apparatus 100B projects infrared light on the plant, and the projection apparatus 100C projects ultraviolet light on the plant. The present embodiment will be described with reference to the case where the projection apparatuses 100A to 100C project light fluxes in the different wavelength bands on the plant, but a plurality of projection apparatuses 100 that project light in the same wavelength band may be present.

Further, the present embodiment will be described on the assumption that the projection apparatuses 100, that is, the projection apparatuses 100A, 100B, and 100C, project light over the same projection range for ease of description. The information processing apparatus 300, when it notifies each of the projection apparatuses 100 of a projection range, can notify a projection range specified by a coordinate system common to the projection apparatuses 100A, 100B, and 100C. That is, the description in the present embodiment will be made on the assumption that when the information processing apparatus 300 notifies the projection apparatuses 100A, 100B, and 100C of the same projection range, the projection apparatuses 100A, 100B, and 100C project light over the same projection range.

In the first embodiment, the imaging section 135 built in the projection apparatus 100 captures an image of a plant, whereas in the third embodiment, the imaging apparatus 360, which is provided as an apparatus external to the projection apparatuses 100A, 100B, and 100C, captures an image of a target plant. The imaging apparatus 360 includes an imaging device, such as a CCD sensor or a CMOS sensor, as does the imaging section 135 in the first embodiment, produces captured image data, and outputs the captured image data to the information processing apparatus 300.

The information processing apparatus 300 is an apparatus, such as a personal computer and a tablet PC. The information processing apparatus 300 includes a control section 310 and a storage section 320 as hardware.

The storage section 320 stores setting information 321, sample images 322, and coordinate conversion data 323, as in the case of the projection apparatus 100 according to the first embodiment. In the present embodiment, the setting information 321 contains identification information that identifies each of the projection apparatuses 100 or the projection apparatuses 100A, 100B, and 100C and information on the color or the wavelength band of the light projected by each of the projection apparatuses 100, with the two types of information related to each other.

The captured image data is inputted from the imaging apparatus 360 to the information processing apparatus 300.

The control section 310 analyzes the inputted captured image data to identify a plant area containing the captured plant. The control section 310 identifies the plant area containing the captured plant and further identifies the image captured position of each region of the plant in the captured image data.

Having identified the plant area and the image captured position of each region in the captured image, the control section 310 determines a projection range over which light is projected and a wavelength band of the light to be projected over the projection range based on the coordinate conversion data 323.

The control section 310 notifies the projection apparatus 100 that projects the light in the determined wavelength band of information on the projection range and causes the projection apparatus 100 to project the light in the determined wavelength band over the determined projection range.

In a case where the captured image data contains a plurality of captured plants, the control section 310 identifies each captured region and the image captured position of the region in the captured image data for each of the captured plants. The control section 310 determines a projection range over which light is projected and a wavelength band of the light to be projected over the projection range based on the identified region and image captured position. For example, assume that the captured image data contains a plant A and a plant B, and that the plant A has budded and the plant B has a visible flower bud. Further assume that the projection apparatus 100A projects blue light, and that the projection apparatus 100B projects red light.

In this case, the control section 310 notifies the projection apparatus 100B of range information representing the projection range and causes the projection apparatus 100B to project red light over the projection range corresponding to the entire plant A and the projection range corresponding to the leaves of the plant B. The control section 310 further notifies the projection apparatus 100A of the range information representing the projection range and causes the projection apparatus 100A to project blue light over the projection range corresponding to the flower bud of the plant B.

As described above, also in the present embodiment, a region of a plant can be identified based on the captured image data produced by the imaging apparatus 360, and any of the projection apparatuses 100A to 100C can project light in the wavelength band according to the identified region. The growth of the plant can therefore be controlled by the light fluxes projected by the projection apparatuses 100A to 100C.

The embodiments described above are each a preferable form in which the invention is implemented. The invention is, however, not limited to the embodiments described above, and a variety of changes can be made thereto to the extent that the changes do not depart from the substance of the invention.

For example, the above-mentioned first to third embodiments have been described with reference to the case where the projection apparatuses 100 and 200 project light to facilitate the growth of a plant. Instead, the wavelength band of light to be projected on a plant can be so controlled that the plant does not grow or weeds are caused to wither.

The invention is also applicable, as the projection target, to a projection target other than a plant but including a region where a function can be controlled by light, such as bonding based on photocuring and nail coating. To use the projection apparatus 100 for photocuring of an adhesive used in a product, only a bonded portion of the product can be irradiated with the light, and the irradiation period can be optimized in correspondence with the type and thickness of the adhesive, whereby an effect of the light irradiation on the product can be suppressed. Further, bonding operation in a large number of different products can be simultaneously performed. In the case where the projection apparatus 100 is used to perform nail coating, a glove that exposes only a nail portion does not need to be used, or the hand does not need to be fixed for a long period, but a nail can be irradiated with optimum light with the state of the nail coating visible. Further, simultaneous optimum light irradiation is achieved on a finger basis, whereby the efficiency of the nail coating process can be improved.

Further, for example, in the case where the method for controlling the projection apparatus 100 described above (method for controlling projection apparatus) is achieved by using a computer provided in the projection apparatus 100 or an external apparatus connected to the projection apparatus 100, the invention may be configured in the form of a program executed by the computer to achieve the method, a recording medium on which the programs is so recorded as to be readable by the computer, or a transmission medium that transmits the program. The recording medium described above can be a magnetic recording medium, an optical recording medium, or a semiconductor memory device. Specific examples of the recording medium may include a flexible disk, an HDD (hard disk drive), a CD-ROM (compact disk read only memory), a DVD (digital versatile disk), a Blu-ray (registered trademark) disc, a magneto-optical disk, a flash memory, a portable recording medium, such as a card-shaped recording medium, or an immobile recording medium. The recording medium described above may instead be a RAM (random access memory), a ROM (read only memory), or an HDD or any other nonvolatile storage device that is an internal storage device provided in the projection apparatus 100 or in an external apparatus connected to the projection apparatus 100.

The process units in the flowchart shown in FIG. 3 are process units divided in accordance with the contents of the primary processes for easy understanding of the processes carried out by the control section 160 of the projection apparatus 100. How to produce the divided process units or the names of the process units shown in the flowchart of FIG. 3 do not limit the embodiment of the invention. A process carried out by the control section 160 can be further divided into a larger number of process units in accordance with the content of the process, and each of the process units can further be divided into a large number of processes. Further, the order in which the processes are carried out in the flowchart described above is not limited to that shown in FIG. 3.

Each of the functional portions of the projection apparatus 100 shown in FIG. 1 and the projection apparatus 200 shown in FIG. 6 represents a functional configuration achieved by cooperation between hardware and software and is not necessarily implemented in a specific form. Therefore, hardware corresponding to each of the functional portions is not necessarily implemented, and a single processor that executes a program can, of course, achieve the functions of the plurality of functional portions. Further, part of the functions achieved by software in the embodiments described above may be achieved by hardware, or part of the functions achieved by hardware may be achieved by software.

The above-mentioned first embodiment has been described with reference to the case where the projection apparatus 100 is a projection apparatus using a transmissive liquid crystal panels. The projection apparatus 100 may instead be a projection apparatus using MEMS (micro electro mechanical systems). The projection apparatus 100 may still instead be a projection apparatus using reflective liquid crystal panels or digital mirror devices.

The entire disclosures of Japanese patent application no. JP 2018-008600 filed on Jan. 23, 2018 is expressly incorporated by reference herein.

What is claimed is:

1. A projection apparatus comprising:
a light source section;
a projection section that projects light outputted from the light source section;
an acquirer that acquires a captured image containing a captured projection target;
an identifier that identifies a region of the projection target contained in the captured image acquired by the acquirer and an image captured position of the region in the captured image; and
a controller that determines a projection range over which the projection section projects light and a wavelength band of the light to be projected over the projection range based on the region and the image captured position identified by the identifier and controls the projection section to cause the projection section to project light in the determined wavelength band over the determined projection range,
wherein the projection target includes different parts and the identified region of the projection target is a part of the projection target.

2. The projection apparatus according to claim 1, wherein the controller determines the projection range over which the projection section projects light and the wavelength band of the light to be projected over the projection range based on a first setting that sets the region and the wavelength band of the light to be projected on the region and a second setting that relates an image captured position in the captured image to a projection range over which the light is projected.

3. The projection apparatus according to claim 1, wherein in a case where the projection target is a plant and the identifier identifies a flower bud of the plant as the region, the controller controls the projection section to cause the projection section to project blue light over a projection range corresponding to an image captured position of the flower bud.

4. The projection apparatus according to claim 3, wherein in a case where the identifier identifies a leaf of the plant as the region, the controller controls the projection section to cause the projection section to project red light over a projection range corresponding to an image captured position of the leaf.

5. The projection apparatus according to claim 3, wherein the controller controls the projection section to cause the projection section to project at least one of infrared light and ultraviolet light onto the plant.

6. The projection apparatus according to claim 1,
further comprising a detection section that detects a temperature as an environment around the projection target,
wherein the controller controls the projection section based on the temperature detected by the detection section to cause the projection section to project infrared light onto the projection target.

7. The projection apparatus according to claim 1,
wherein the projection section includes
a modulator that modulates the light outputted from the light source section, and
a light separator that separates the light outputted from the light source section into light fluxes in a plurality of wavelength bands and outputs light in the wavelength band selected by the controller out of the light fluxes in the plurality of separated wavelength bands to the modulator.

8. The projection apparatus according to claim 1,
wherein the light source section includes a visible light source that emits visible light, an infrared light source that emits infrared light, an ultraviolet light source that emits ultraviolet light, and a light source driver that drives the visible light source, the infrared light source, and the ultraviolet light source, and the controller controls the light source driver to cause the light source driver to selectively drive any of the visible light source, the infrared light source, and the ultraviolet light source so that the driven light source projects light in the determined wavelength band.

9. A projection system comprising:

an imaging apparatus that captures an image of a projection target;

a plurality of projection apparatuses that project light fluxes in different wavelength bands; and a management apparatus including a communication section and a control section that determines a projection apparatus that projects light on the projection target based on a captured image received from the imaging apparatus via the communication section, wherein the control section identifies a region of the projection target contained in the acquired captured image and an image captured position of the region in the captured image, determines a projection range over which the projection apparatus projects light and a wavelength band of the light to be projected over the projection range based on the identified region and image captured position, and notifies the projection apparatus that projects light in the determined wavelength band of the determined projection range, the projection target includes different parts, and the identified region of the projection target is a part of the projection target.

10. The projection system according to claim 9, wherein the control section identifies a captured region and an image captured position of the region in the captured image, determines a projection range over which light is projected and a wavelength band of the light to be projected over the projection range based on the identified region and image captured position, and notifies the projection apparatus that projects light in the determined wavelength band of the determined projection range for each of the plurality of projection targets contained in the captured image.

11. A method for controlling a projection apparatus that projects light, the method comprising:

acquiring a captured image containing a captured projection target;

identifying a region of the projection target contained in the acquired captured image and an image captured position of the region in the captured image;

determining a projection range over which the projection apparatus projects light and a wavelength band of the light to be projected over the projection range based on the identified region and image captured position; and projecting light in the determined wavelength band over the determined projection range, wherein the projection target includes different parts and the identified region of the projection target is a part of the projection target.

12. The method for controlling projection apparatus according to claim 11, further comprising determining the projection range over which is projected light and the wavelength band of the light to be projected over the projection range based on a first setting that sets the region and the wavelength band of the light to be projected on the region and a second setting that relates an image captured position in the captured image to a projection range over which the light is projected.

13. The method for controlling projection apparatus according to claim 11, further comprising projecting blue light over a projection range corresponding to an image captured position of the flower bud, in a case where the projection target is a plant and a flower bud of the plant is identified as the region.

14. The method for controlling projection apparatus according to claim 13, further comprising projecting red light over a projection range corresponding to an image captured position of the leaf, in a case where a leaf of the plant is identified as the region.

15. The method for controlling projection apparatus according to claim 13, further comprising projecting at least one of infrared light and ultraviolet light onto the plant.

16. The method for controlling projection apparatus according to claim 11, further comprising detecting a temperature as an environment around the projection target, and projecting infrared light onto the projection target based on the temperature detected.

17. The method for controlling projection apparatus according to claim 11, further comprising modulating light in the wavelength band selected the light fluxes in the plurality of separated wavelength bands.

18. The method for controlling projection apparatus according to claim 11, further comprising projecting light in the determined wavelength band by selectively driving any of the visible light source, the infrared light source, and the ultraviolet light source.

* * * * *